(12) United States Patent
Raveh et al.

(10) Patent No.: US 11,798,295 B2
(45) Date of Patent: Oct. 24, 2023

(54) MODEL FREE LANE TRACKING SYSTEM

(71) Applicant: GM Global Technology Operations LLC, Detroit, MI (US)

(72) Inventors: Alon Raveh, Herzeliya (IL); Shaul Oron, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 268 days.

(21) Appl. No.: 17/241,532

(22) Filed: Apr. 27, 2021

(65) Prior Publication Data

US 2022/0366173 A1    Nov. 17, 2022

(51) Int. Cl.
| | |
|---|---|
| *G06V 20/56* | (2022.01) |
| *G01C 21/00* | (2006.01) |
| *G06F 18/23* | (2023.01) |
| *G06F 18/25* | (2023.01) |
| *G06F 18/2113* | (2023.01) |
| *G05D 1/02* | (2020.01) |

(52) U.S. Cl.
CPC ....... *G06V 20/588* (2022.01); *G01C 21/3819* (2020.08); *G06F 18/2113* (2023.01); *G06F 18/23* (2023.01); *G06F 18/253* (2023.01); *G05D 1/0212* (2013.01); *G05D 2201/0213* (2013.01)

(58) Field of Classification Search
CPC ........ G08G 1/161; G08G 1/163; G08G 1/166; B60R 1/00; B60R 2300/30; B60W 2554/00
See application file for complete search history.

(56) References Cited

U.S. PATENT DOCUMENTS

| | | | |
|---|---|---|---|
| 6,226,571 B1 * | 5/2001 | Kai | G01S 13/931 701/1 |
| 6,748,316 B2 * | 6/2004 | Takayama | G08G 1/096888 701/428 |
| 7,212,907 B2 * | 5/2007 | Heinrichs-Bartscher | B60W 30/16 701/96 |
| 7,392,118 B2 * | 6/2008 | Servera Serapio | G08G 1/161 701/28 |
| 7,954,120 B2 * | 5/2011 | Roberts | H04H 60/33 725/12 |
| 8,253,796 B2 * | 8/2012 | Renkis | G08B 13/19682 382/199 |
| 8,712,600 B2 * | 4/2014 | Hayashi | H01L 21/67733 701/2 |
| 9,815,462 B2 * | 11/2017 | Pandita | G06T 7/73 |
| 10,065,642 B2 * | 9/2018 | Pfeiffer | B60W 30/16 |
| 10,449,899 B2 * | 10/2019 | Gupta | B60R 1/00 |

* cited by examiner

*Primary Examiner* — Yosef Kassa
(74) *Attorney, Agent, or Firm* — CANTOR COLBURN LLP (57) ABSTRACT

A vehicle, system and method of navigating the vehicle. The system includes a sensor and a processor. The sensor is configured to obtain a first set of detection points representative of a lane of a road section at a first time step and a second set of detection points representative of the lane at a second time step. The processor is configured to determine a set of predicted points for the second time step from the first set of detection points, obtain a set of fused points from the second set of detection points and the set of predicted points, and navigate the vehicle using the set of fused points.

20 Claims, 7 Drawing Sheets

MODEL FREE LANE TRACKING SYSTEM

INTRODUCTION

The subject disclosure relates to a system and method for maintaining a vehicle within a lane and, in particular, to a method of tracking a lane that includes comparing a current detected location of the lane with a predicted location of the lane without use of a lane model.

Vehicles operating in an autonomous or semi-autonomous mode can maintain their location with a road section by tracking a lane or lane marking of the road section over time. Some tracking methods use different modeling representations for lanes (for example, polynomial, splines, etc.) using lane modeling introduces multiple challenges including model prediction and model update that are not trivial and can be computationally expensive. Additionally, using lane models introduces fitting errors especially in curved lanes and complex road geometry. Using models reduces the data cardinality which can lead to information loss. Accordingly, it is desirable to provide a method of tracking a lane that does not use a lane model.

SUMMARY

In one exemplary embodiment, a method of navigating a vehicle is disclosed. A first set of detection points representative of a lane of a road section is obtained at a first time step at a sensor of the vehicle. A set of predicted points for a second time step is determined at a processor from the first set of detection points. A second set of detection points representative of the lane is obtained at the sensor at the second time step. A set of fused points is obtained at the processor from the second set of detection points and the set of predicted points. The vehicle is navigated at the processor using the set of fused points.

In addition to one or more of the features described herein, obtaining the set of fused points further includes forming a set of updated points that includes the second set of detection points and the set of predicted points, forming a cluster of at least two updated points and forming a fused point for the cluster from the at least two updated points within the cluster. Forming the fused point for the cluster further includes forming a weighted average of the at least two updated points. The weighted average is based on an uncertainty of the at least two updated points. The method further includes filtering out an updated point within the cluster using a criterion. The criterion is based on at least one of an uncertainty associated with an updated point, an age of the updated point, and a noise level of the updated point. A detection point in the first set of detection points has a covariance matrix associated with the vehicle and the method further includes determining a predicted point in the set of predicted points by updating the covariance matrix using a time interval between the first time step to the second time step.

In another exemplary embodiment, a system for navigating a vehicle is disclosed. The system includes a sensor and a processor. The sensor is configured to obtain a first set of detection points representative of a lane of a road section at a first time step and a second set of detection points representative of the lane at a second time step. The processor is configured to determine a set of predicted points for the second time step from the first set of detection points, obtain a set of fused points from the second set of detection points and the set of predicted points, and navigate the vehicle using the set of fused points.

In addition to one or more of the features described herein, the processor is further configured to obtain the set of fused points by forming a set of updated points that includes the second set of detection points and the set of predicted points, forming a cluster of at least two updated points and forming a fused point for the cluster from the at least two updated points within the cluster. The processor is further configured to form the fused point for the cluster by forming a weighted average of the at least two updated points. The weighted average is based on an uncertainty of the at least two updated points. The processor is further configured to filter out an updated point within the cluster using a criterion. The criterion is based on at least one of an uncertainty associated with an updated point, an age of the updated point, and a noise level of the updated point. A detection point in the first set of detection points has a covariance matrix associated with the vehicle, and the method further includes determining a predicted point in the set of predicted points by updating the covariance matrix using a time interval between the first time step to the second time step.

In yet another exemplary embodiment, a vehicle is disclosed. The vehicle includes a sensor and a processor. The sensor is configured to obtain a first set of detection points representative of a lane of a road section at a first time step and a second set of detection points representative of the lane at a second time step. The processor is configured to determine a set of predicted points for the second time step from the first set of detection points, obtain a set of fused points from the second set of detection points and the set of predicted points, and navigate the vehicle using the set of fused points.

In addition to one or more of the features described herein, the processor is further configured to obtain the set of fused points by forming a set of updated points that includes the second set of detection points and the set of predicted points, forming a cluster of at least two updated points and forming a fused point for the cluster from the at least two updated points within the cluster. The processor is further configured to form the fused point for the cluster by forming a weighted average of the at least two updated points. The weighted average is based on an uncertainty of the at least two updated points. The processor is further configured to filter out an updated point within the cluster using a criterion. The criterion is based on at least one of an uncertainty associated with an updated point, an age of the updated point, and a noise level of the updated point.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
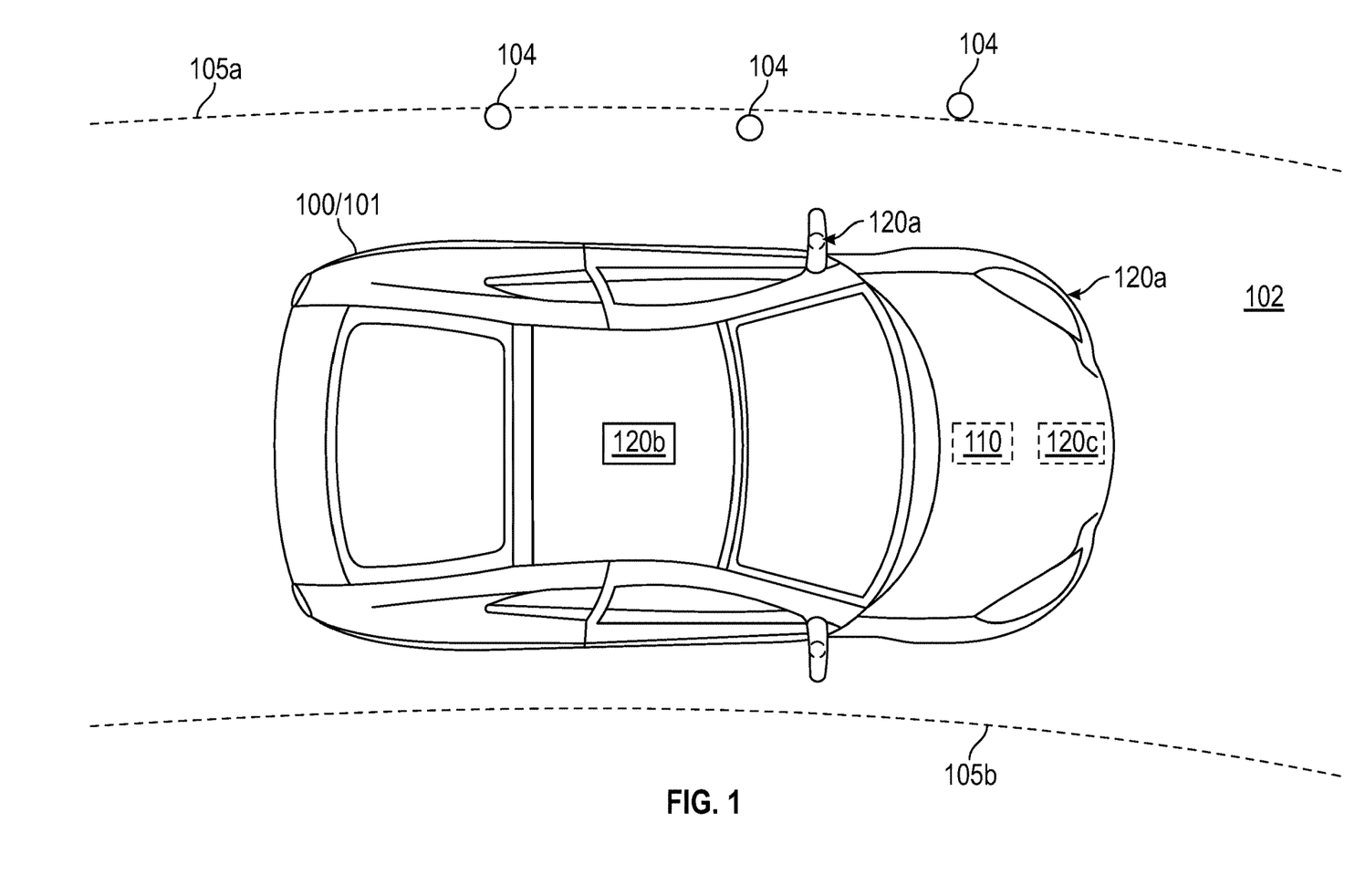
FIG. 1 is a plan view of a vehicle that includes a lane tracking system for vehicle navigation in an illustrative embodiment.

In accordance with an exemplary embodiment, FIG. 1 is a plan view of a vehicle 100 that includes a lane tracking system for vehicle navigation. The exemplary vehicle 100 in FIG. 1 is an automobile 101. The vehicle 100 can be an autonomous vehicle, a semi-autonomous vehicle, or can be manually driven by a driver. The vehicle 100 is shown within two lane lines 105a, 105b (referred to herein generally by 105) of a road section 102. The vehicle includes a controller 110 and one or more sensors 120. Exemplary sensors 120 shown in FIG. 1 include a one or more cameras 120a, a lidar system 120b, and a radar system 120c (generally referred to as 120). One or more cameras 120a, the lidar system 120b, or a combination may be used by the controller 110 to obtain detection points 104 of a given lane line such as lane line 105a. The exemplary types, numbers, and positions of the sensors 120 shown in FIG. 1 are not intended to be a limitation on the types, numbers and positions of sensors 120 in any alternate embodiments of the vehicle 100. The sensors 120 obtain images of detection points 104 of a lane line at periodically spaced timesteps. In an embodiment, a set of detection points is obtained by the sensors 120 at a rate of about 100 time per second.

The controller 110 performs lane tracking using the methods discussed herein. The controller 110 may additionally implement semi-autonomous or autonomous control of the vehicle 100 based, in part, on the lane tracking. The controller 110 obtains the detection points 104 from raw images obtained by the one or more sensors 120, performs lane tracking based on the detection points 104 and navigates the vehicle based on the lane tracking. For example, the controller 110 can perform image processing on one or more images obtained within a field of view of the one or more cameras 120a around the vehicle 100. The image processing may identify detection points 104 associated with one or more lane lines 105, such as lane line 105a. Alternatively, a point cloud obtained using a lidar system 120b may be processed to obtain the detection points 104. In order to perform semi-autonomous or autonomous control of the vehicle 100, the lane line 105a in the vicinity of the vehicle 100 is tracked based on the detection points 104. The methods disclosed herein represent lanes as sets of points without fitting the points to a model, such as polynomial or spline. Bypassing lane modeling simplifies prediction and update steps while maintaining a high degree of data cardinality. The methods disclosed herein can accurately and efficiently track highly curved lanes in complex scenes.

Figure 2:
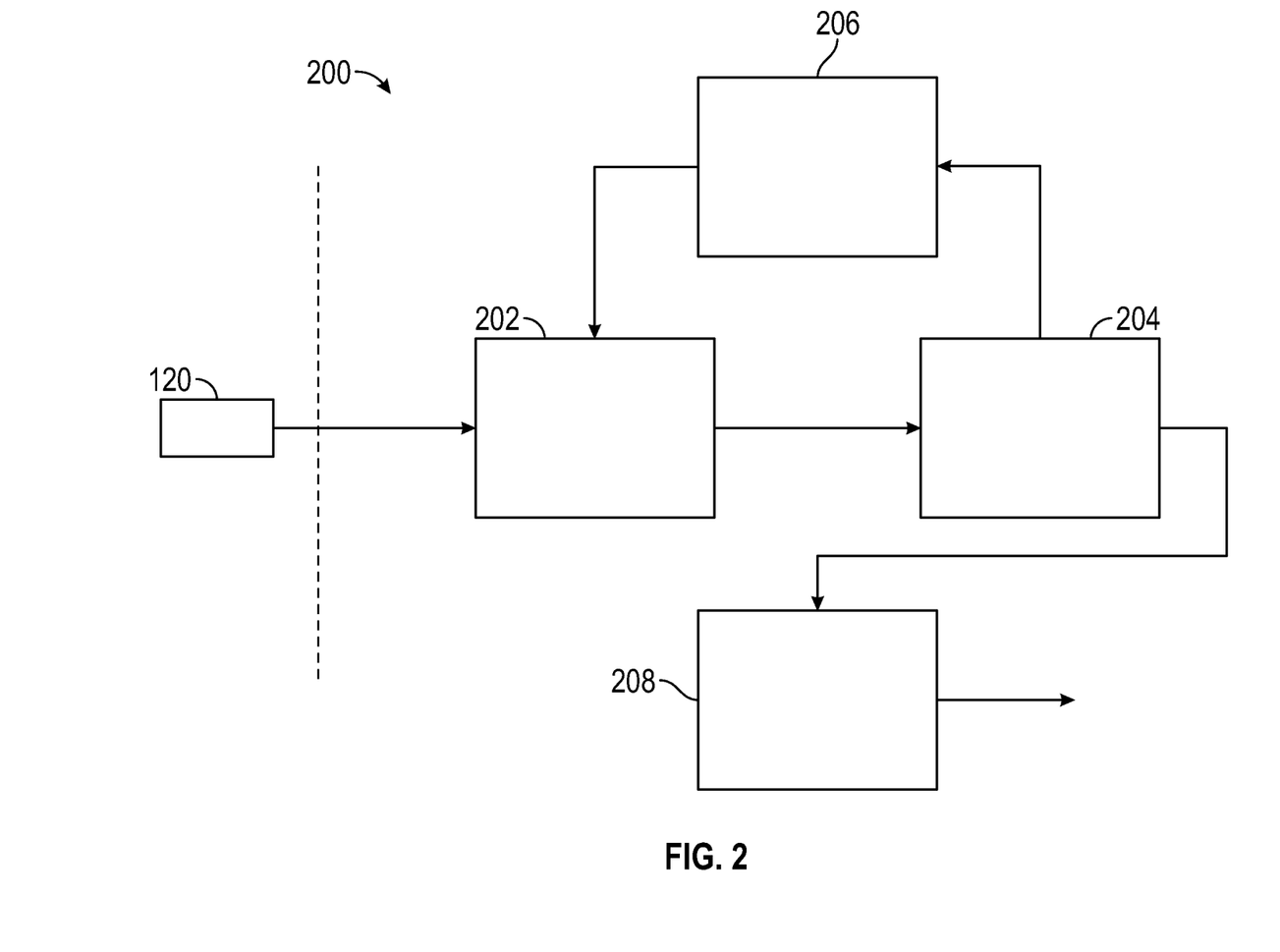
FIG. 2 shows a block diagram of a method performed by the controller for tracking a lane or lane line, in an embodiment.

FIG. 2 shows a block diagram 200 of a method performed by the controller 110 for tracking a lane or lane line, in an embodiment. The method includes obtaining detection points at a first timestep and predicting the location of these detection points with respect to the vehicle at a second timestep. The predicted locations are compared to detection points obtained by the sensors at the second timestep. The method also includes an association step for finding an optimal overlay of the predicted locations and the detection points in the second time step as well as an update step for merging the points of the optimal overlay into a set of updated points. The method also includes a fusion step in which updated points are grouped into clusters and a representative point for the cluster is selected, also referred to herein as a fused point. The fusion step includes filtering or removing points from the cluster according to one or more selected criteria prior to determining the representative point.

The block diagram 200 includes various modules for performing the method disclosed herein, including an association module 202, an update module 204, a prediction module 206 and a fusion module 208. The method can cycle through the association module 202, an update module 204, and a prediction module 206 at each of a plurality of timesteps. The association module 202 receives set of predicted points from the prediction module 206 and a set of detection points from the sensors 120. The predicted points are based on detection points from a previous time step and are determined from calculations that use one or more dynamic parameters of the vehicle.

The update module 204 receives the associated points and merges these points into a single set of updated points in which there is no distinction between predicted points and the detection points. The updated points are considered detection points with respect to the next cycle through the block diagram 200. The prediction module 206 receives the updated points and predicts a set of prediction points for the next timestep. The fusion module 208 creates a set of fused points from the updated points. The set of fused points provide representative points of a lane or lane lines that can be used at the controller 110 for lane tracking and navigation.

The association module 202 performs an association step which includes performing solving an assignment problem between a current set of detected lanes and the set of predicted lanes, each being a set of points. Solving the assignment problem includes performing a distance evaluation between each of the current set of detection lanes and the set of predicted lanes and selecting an optimal lane to lane association. An association cost is incurred for an overlay upon assignment of a point from the set of predicted lanes to a point from the current set of detected lanes. The association cost of the overlay is a summation of the association cost for each individual assignment. The set of detected lanes is subsequently used to update the current set of predicted lanes to which it is associated.

At the update module 204, the set of detected lanes is used to update the set of predicted lanes by merging the two sets together to one unified set of points that is referred to as the updated set of points. This update technique is simple and allows the detected points to be kept without information loss. To avoid huge memory consumption due to this update method, the points are filtered as part of a subsequent fusing method.

Referring to the prediction module 206, the points received at the prediction module include various measured parameters, such as the coordinates (x, y) of the detection point, and dynamic parameters of the vehicle, such as the such as the vehicle's speed, heading, acceleration, yaw rotation, etc. Assuming that lane lines are static, a current set of predicted lanes for the current time step t can be obtained from points from the previous time step by transforming the previous point set at time (t−Δt) by an inverse transformation of parameters measured regarding a vehicle maneuver performed at t−Δt. The measured parameters can also include various uncertainties for each point. Each point can have a covariance matrix based on its parameters. Predicting a point at the subsequent time step includes updating the covariance matrix. In an embodiment, the covariance matrix Q(t) at a current timestep can be approximated by the covariance matrix Q(t−Δt) at the previous timestep as shown in Eq. (1):

$$Q(t) = Q(t-\Delta t) + \Delta Q(x, y, \omega_{ego}, \sigma_{\omega_{ego}}^2, \sigma_{v_{ego}}^2, \sigma_{\alpha_{ego}}^2) \quad \text{Eq. (1)}$$

where x is the x-coordinate of a detection, y is the y-coordinate of a detection, $\omega_{ego}$ is the yaw rotation of the vehicle, $\sigma_{\omega_{ego}}^2$ is an uncertainty associated with the yaw rotation, $\sigma_{v_{ego}}^2$ is an uncertainty associated with the velocity of the vehicle, and $\sigma_{\alpha_{ego}}^2$ is an uncertainty associated with the acceleration of the vehicle. In an embodiment, the ΔQ can be approximated by:

$$\Delta Q(x, y, \omega_{ego}, \sigma_{\omega_{ego}}^2, \sigma_{v_{ego}}^2, \sigma_{a_{ego}}^2) = \quad \text{Eq. (2)}$$

$$\begin{bmatrix} \Delta t \cdot \sigma_{\omega_{ego}}^2 \cdot y^2 & \Delta t \cdot x \cdot y \\ * & \Delta t \cdot \sigma_{\omega_{ego}}^2 \cdot x^2 \end{bmatrix} +$$

$$\begin{bmatrix} \Delta t \cdot \sigma_{v_{ego}}^2 & -\frac{1}{2}\Delta t^2 \cdot \sigma_{v_{ego}}^2 \cdot \omega_{ego} \\ * & \frac{1}{3}\Delta t^3 \cdot \sigma_{v_{ego}}^2 \cdot \omega_{ego}^2 \end{bmatrix} +$$

$$\begin{bmatrix} \frac{1}{3}\Delta t^3 \cdot \sigma_{a_{ego}}^2 & \frac{1}{4}\Delta t^4 \cdot \sigma_{a_{ego}}^2 \cdot \omega_{ego} \\ * & \frac{1}{5}\Delta t^5 \cdot \sigma_{a_{ego}}^2 \cdot \omega_{ego}^2 \end{bmatrix}$$

Figure 3:
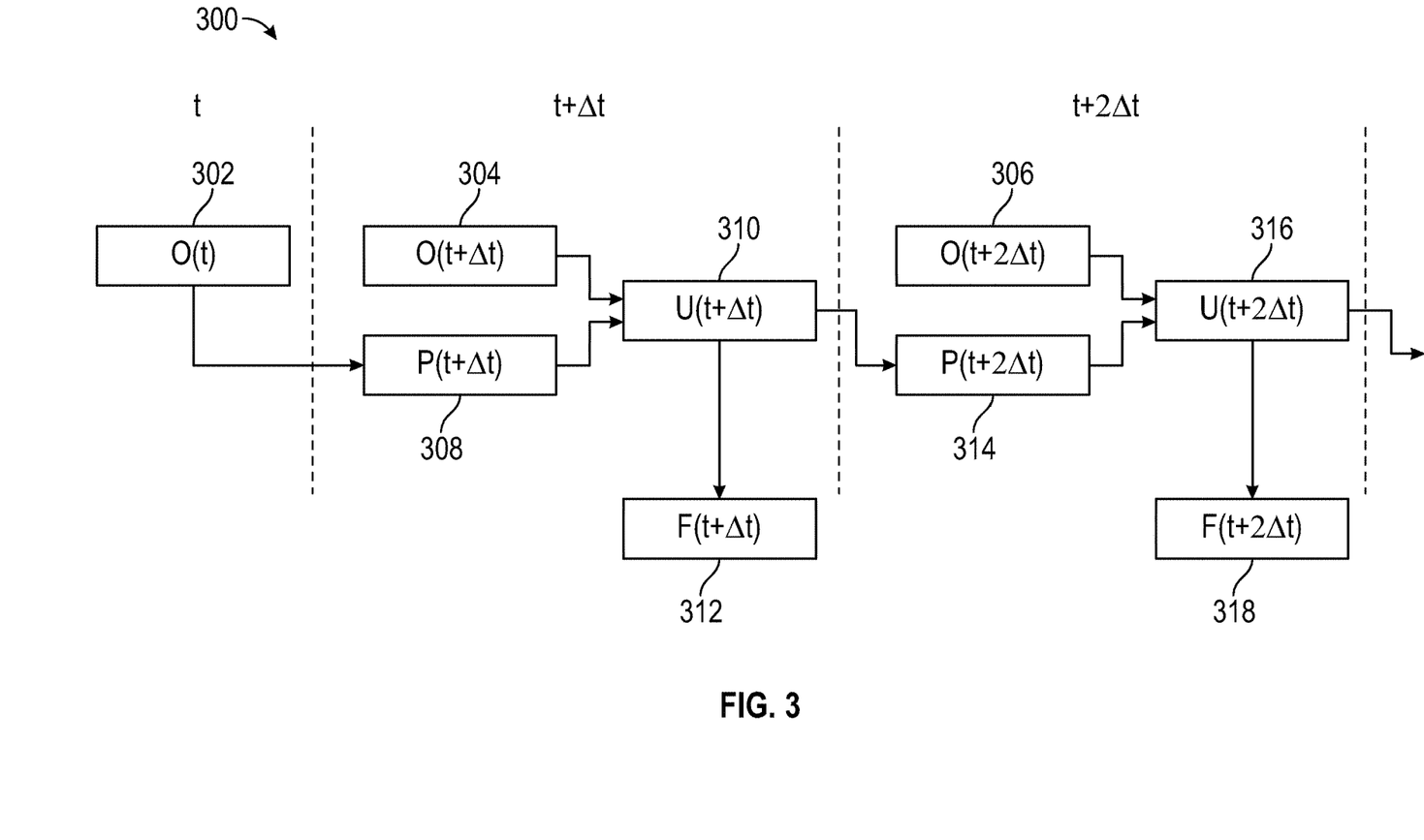
FIG. 3 shows a time chart illustrating a flow of data through the block diagram of FIG. 2.

FIG. 3 shows a time chart 300 illustrating a flow of data through the block diagram 200 of FIG. 2. For illustrative purposes, the time chart includes only three timesteps, although this is not meant to be a limitation on the number of timesteps that can be executed by the controller 110.

Images or other sensed data are obtained from the sensors 120 at each time step. The images include a set of detection points indicative of a lane line. A first set of detection points obtained during the first time step (t) is indicated by O(t) (302), A second set of detection points obtained during the second time step (t+Δt) is indicated by O(t+Δt) (304) and a third set of detection points obtained during the third time step (t+2Δt) is indicated by O(t+2Δt) (306), where Δt is a time interval between time steps. The first set of detection points is used to generate a first set of predicted points P(t+Δt) (308) via the prediction module 206. The second set of detection points O(t+Δt) 304 is associated with the first set of predicted points P(t+1) (308) via the association module 202. The associated points are merged to form the first set of updated points U(t+Δt) 310 via the update module 204. The first set of updated points U(t+Δt) 310 is used to generate a first fused data set F(t+Δt) 312 via the fusion module 208. The first set of updated points U(t+Δt) 310 is also used to generate the second set of predicted points P(t+2Δt) 314 at the third time step t+2Δt via the prediction module 206.

The process that occurs during the third time step is similar to the process of the second time step and includes associating the second set of predicted points P(t+2Δt) 314 to the third set of detection points O(t+2Δt) 306, forming a second set of updated points U(t+2Δt) 316, generating the second set of fused points F(t+2Δt) 318 from the updated points U(t+2Δt) 316, and generating a third set of predicted points for the subsequent time step.

Figure 4:
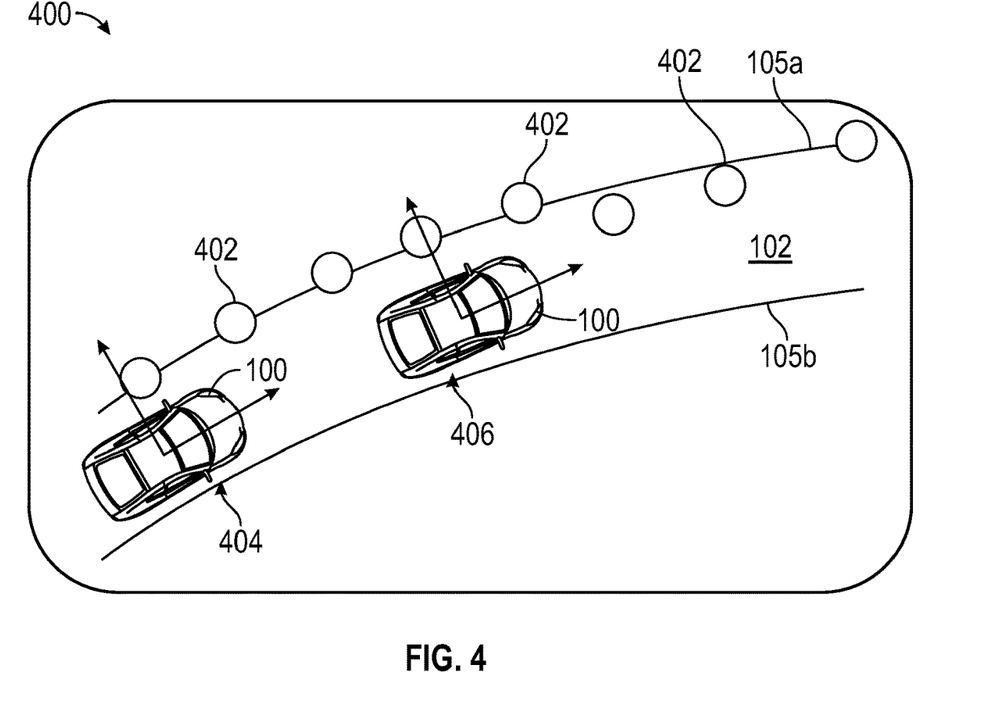
FIG. 4 shows a plan view of the road section including an illustrative set of predicted points for a selected time step.

FIG. 4 shows a plan view 400 of the road section 102 including an illustrative set of predicted points 402 for a selected time step (i.e., the second time step (t+Δt)). As discussed with respect to the time chart 300 of FIG. 3, the predicted points 402 are generated from the detection points obtained when the vehicle 100 is at a first location 404 during a first timestep (t). The predicted points 402 are a prediction of where the detection points will be relative to the vehicle 100 at a second location 406 during the second timestep (t+Δt).

Figure 5:
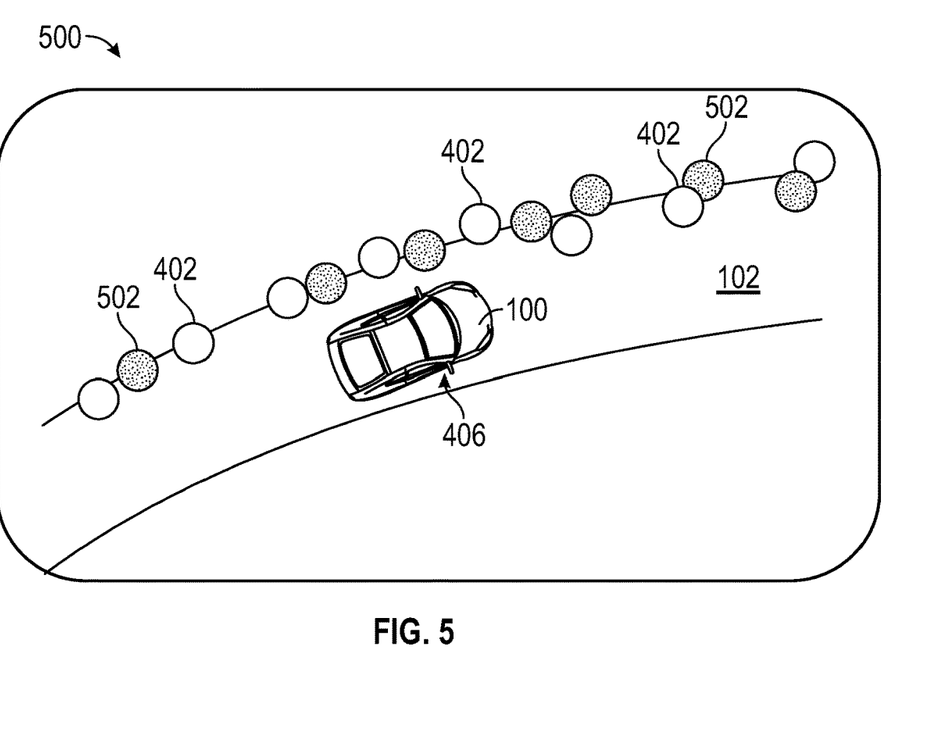
FIG. 5 shows a plan view of the road section including the predicted points from FIG. 4 and a second set of detection points obtained during a second time step.
Figure 6:
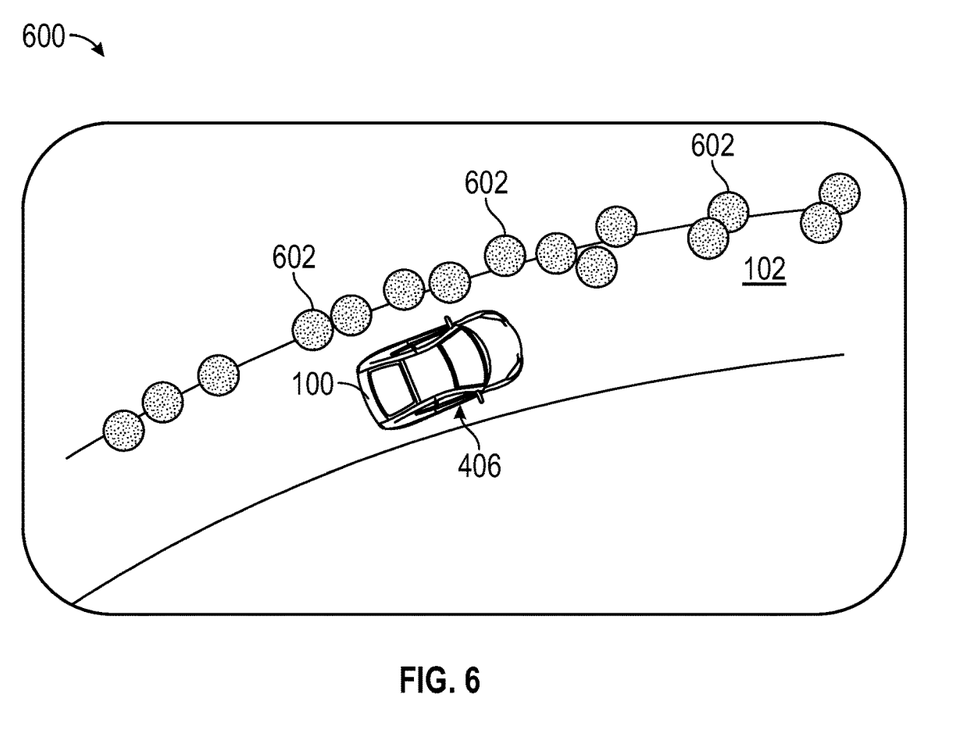
FIG. 6 shows a plan view of the road section illustrating the updated points generated by merging the predicted points with the second set of detection points.

FIG. 5 shows a plan view 500 of the road section 102 including the predicted points 402 from FIG. 4 and a second set of detection points 502 obtained during a second time step. FIG. 6 shows a plan view 600 of the road section 102, illustrating the updated points 602 generated by merging the predicted points 402 with the second set of detection points 502.

Figure 7:
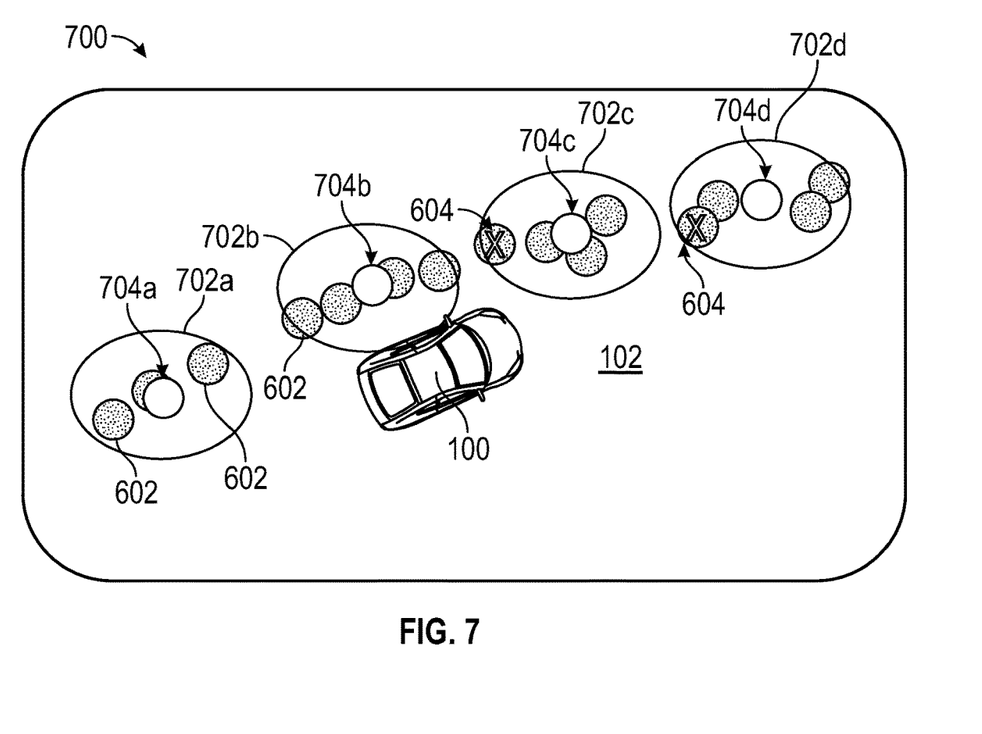
FIG. 7 shows a plan view of the road section illustrating operations that occur at a fusion module of the lane tracking system.

FIG. 7 shows a plan view 700 of the road section 102, illustrating operations that occur at the fusion module 208. The fusion module 208 performs a clustering operation on the updated points 602, as shown by first cluster 702a, second cluster 702b, third cluster 702c and fourth cluster 702d. Within each cluster, a filtering process can be performed to remove points 604 that have lost relevancy toward determining a fused point for a selected reason. The updated points 602 remaining within a cluster are used to determine a representative point for the cluster or a fused point. A first fused point 704a represents the first cluster 702a, a second fused point 704b represents the second cluster 702b, a third fused point 704c represents the third cluster 702c, and a fourth fused point 704d represents the fourth cluster 702d. The fused points are published to the controller 110, which performs an action or maneuver at the vehicle 100. The fusing algorithm used affects the points that are published to the controller 110. The lane tracking system keeps the raw points set information for later use.

Figure 8:
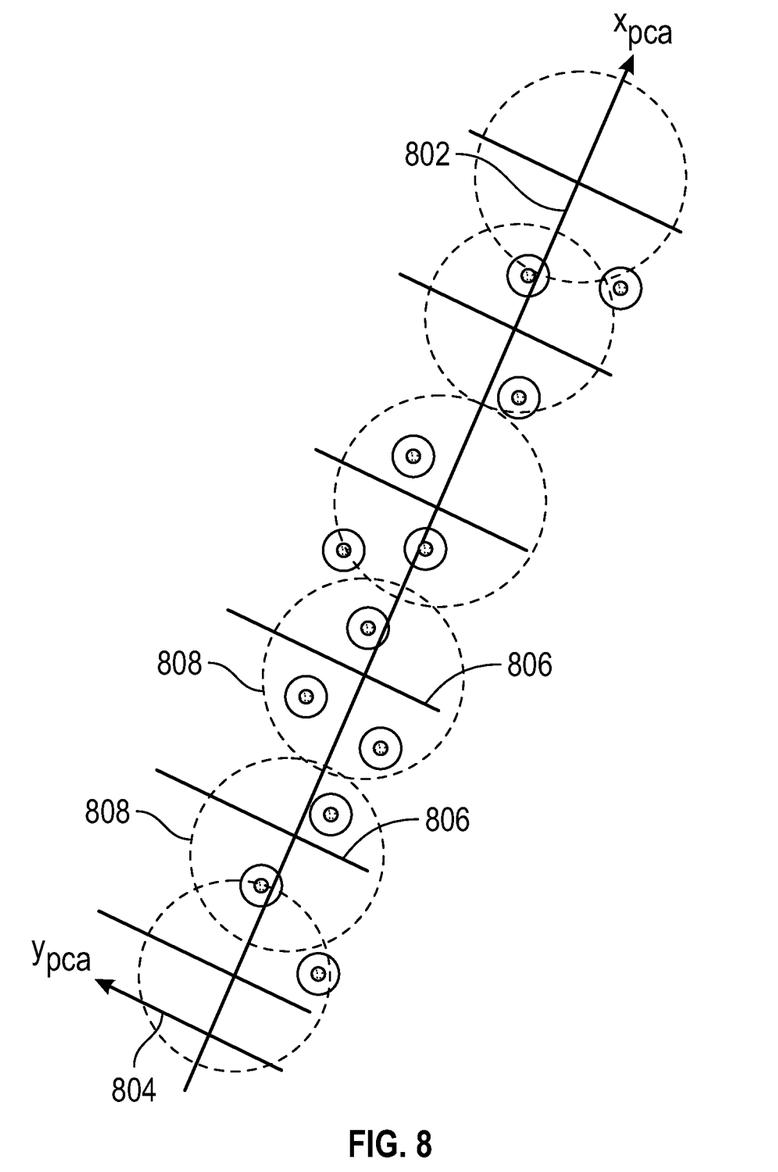
FIG. 8 shows an illustrative example of a clustering process performed at the fusion module.

FIG. 8 shows an illustrative example of a clustering process performed at the fusion module 208. A principal component analysis can be performed on the updated points to determine a set of eigenvectors, such as $x_{pca}$ 802 and $y_{pca}$ 804. A sample region can be marked along the first eigenvector direction (i.e. $x_{pca}$ 802), as indicated by markings 806. Updated points that are in a selected proximity r to a marking 806 can be grouped within a cluster 808 associated with the marking.

Figure 9:
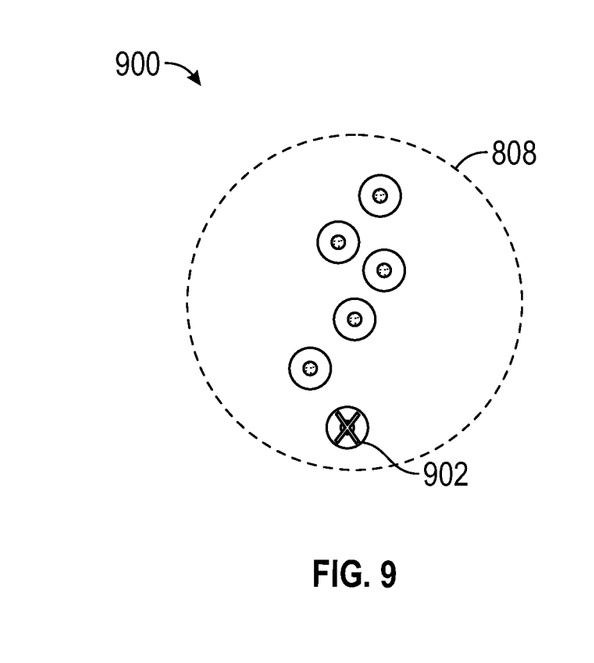
FIG. 9 illustrates a filtering step performed at the fusion module.

FIG. 9 illustrates a filtering step 900 performed at the fusion module 208. The filtering step is used to select the updated points within a cluster 808 as candidates for the subsequent fusion step. Points (e.g. filtered point 902) can be removed or filtered out according to a selected criterion or quality metric. For example, a point may have an associated uncertainty that is greater than a selected threshold or may have an age that is greater than a selected time threshold and thus having low relevancy with respect to future calculations, etc. A noise level of the point can also be used as a filtering criterion. The step of removing points reduces an amount of memory that is consumed.

Figure 10:
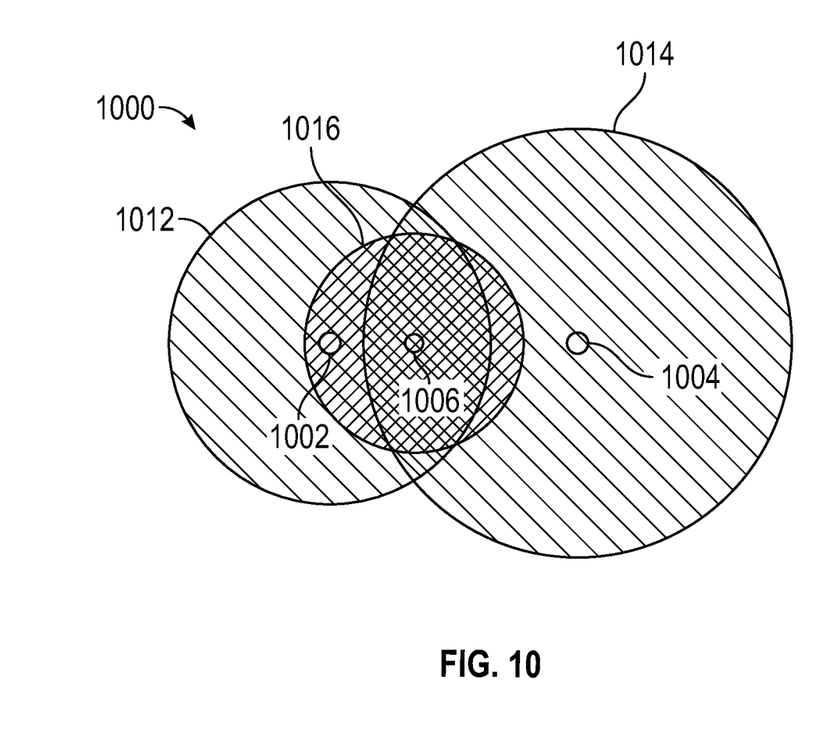
FIG. 10 shows a diagram illustrating a fusion of points.

FIG. 10 shows a diagram 1000 illustrating a fusion of points, in an illustrative embodiment. Although shown with respect to two updated points, the fusion step can include fusion of any number of points. Fusing the points can include obtaining a weighted average of the at least two updated points. In the illustrative example of FIG. 10, a first updated point 1002 and a second updated point 1004, both within a same cluster, are fused to form the fused point 1006. The fusion step assumes each of the points is an uncorrelated Gaussian measurement for the same position in space. The fusion step of multiple points (e.g., points 1002 and the point 1004) is given mathematically as shown in Eq. (3):

$$T_{optimal} = \sum_{i=1}^{n} \left[ \frac{\prod_{\substack{j=1 \\ j \neq i}}^{n} \sigma_j^2}{\sum_{j=1}^{n} \left[ \prod_{\substack{k=1 \\ k \neq j}}^{n} \sigma_k^2 \right]} T_i \right] \quad \text{Eq. (3)}$$

where $\sigma_1^2$ is an uncertainty of the first updated point 1002 and $\sigma_2^2$ is an uncertainty of the second updated point 1004. The values $T_1$ and $T_2$ represent the parameters of the first updated point 1002 and the second updated point 1004, respectively. The uncertainty for the fused point is given by Eq. (4):

$$\sigma_{optimal}^2 = \frac{\prod_{j=1}^{n} \sigma_j^2}{\sum_{j=1}^{n} \left[ \prod_{\substack{k=1 \\ k \neq j}}^{n} \sigma_k^2 \right]} \quad \text{Eq. (4)}$$

In various embodiments, the optimal parameters can be determined separately for each parameter (i.e., x-coordinate, y-coordinate, heading, etc.) assuming no correlation between the uncertainties of these parameters.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of navigating a vehicle, comprising:
    obtaining, at a sensor of the vehicle, a first set of detection points representative of a lane of a road section at a first time step;
    determining, at a processor, a set of predicted points for a second time step from the first set of detection points;
    obtaining, at the sensor, a second set of detection points representative of the lane at the second time step;
    obtaining, at the processor, a set of fused points by forming a set of updated points that includes the second set of detection points and the set of predicted points, forming a cluster of at least two updated points and forming a fused point for the cluster from the at least two updated points within the cluster; and
    navigating the vehicle, at the processor, using the set of fused points.

2. The method of claim 1, wherein forming the fused point for the cluster further comprises forming a weighted average of the at least two updated points.

3. The method of claim 2, wherein the weighted average is based on an uncertainty of the at least two updated points.

4. The method of claim 1, further comprising filtering out an updated point within the cluster using a criterion.

5. The method of claim 4, wherein the criterion is based on at least one of: (i) an uncertainty associated with an updated point; (ii) an age of the updated point; and (iii) a noise level of the updated point.

6. A method of navigating a vehicle, comprising:
    obtaining, at a sensor of the vehicle, a first set of detection points representative of a lane of a road section at a first time step;
    determining, at a processor, a set of predicted points for a second time step from the first set of detection points;
    obtaining, at the sensor, a second set of detection points representative of the lane at the second time step;
    obtaining, at the processor, a set of fused points from the second set of detection points and the set of predicted points; and
    navigating the vehicle, at the processor, using the set of fused points;
    wherein a detection point in the first set of detection points has a covariance matrix associated with the vehicle, further comprising determining a predicted point in the set of predicted points by updating the covariance matrix using a time interval between the first time step to the second time step.

7. The method of claim 6, wherein the covariance matrix includes at least one of: (i) an uncertainty in a yaw rotation of the vehicle; (ii) an uncertainty in a velocity of the vehicle; and (iii) an uncertainty in an acceleration of the vehicle.

8. A system for navigating a vehicle, comprising:
    a sensor configured to obtain a first set of detection points representative of a lane of a road section at a first time step and a second set of detection points representative of the lane at a second time step; and
    a processor configured to:
        determine a set of predicted points for the second time step from the first set of detection points;
        obtain a set of fused points by forming a set of updated points that includes the second set of detection points and the set of predicted points, forming a cluster of at least two updated points and forming a fused point for the cluster from the at least two updated points within the cluster; and
    navigate the vehicle using the set of fused points.

9. The system of claim 8, wherein the processor is further configured to form the fused point for the cluster by forming a weighted average of the at least two updated points.

10. The system of claim 9, wherein the weighted average is based on an uncertainty of the at least two updated points.

11. The system of claim 8, wherein the processor is further configured to filter out an updated point within the cluster using a criterion.

12. The system of claim 11, wherein the criterion is based on at least one of: (i) an uncertainty associated with an updated point; (ii) an age of the updated point; and (iii) a noise level of the updated point.

13. A system for navigating a vehicle, comprising:
    a sensor configured to obtain a first set of detection points representative of a lane of a road section at a first time step and a second set of detection points representative of the lane at a second time step; and a processor configured to:

determine a set of predicted points for the second time step from the first set of detection points;

obtain a set of fused points from the second set of detection points and the set of predicted points; and navigate the vehicle using the set of fused points;

wherein a detection point in the first set of detection points has a covariance matrix associated with the vehicle, further comprising determining a predicted point in the set of predicted points by updating the covariance matrix using a time interval between the first time step to the second time step.

14. The system of claim 13, wherein the covariance matrix includes at least one of: (i) an uncertainty in a yaw rotation of the vehicle; (ii) an uncertainty in a velocity of the vehicle; and (iii) an uncertainty in an acceleration of the vehicle.

15. A vehicle, comprising:

a sensor configured to obtain a first set of detection points representative of a lane of a road section at a first time step and a second set of detection points representative of the lane at a second time step; and a processor configured to:

determine a set of predicted points for the second time step from the first set of detection points;

obtain a set of fused points by forming a set of updated points that includes the second set of detection points and the set of predicted points, forming a cluster of at least two updated points and forming a fused point for the cluster from the at least two updated points within the cluster; and navigate the vehicle using the set of fused points.

16. The vehicle of claim 15, wherein the processor is further configured to form the fused point for the cluster by forming a weighted average of the at least two updated points.

17. The vehicle of claim 16, wherein the weighted average is based on an uncertainty of the at least two updated points.

18. The vehicle of claim 15, wherein the processor is further configured to filter out an updated point within the cluster using a criterion.

19. The vehicle of claim 18, wherein the criterion is based on at least one of: (i) an uncertainty associated with an updated point; (ii) an age of the updated point; and (iii) a noise level of the updated point.

20. A vehicle, comprising:

a sensor configured to obtain a first set of detection points representative of a lane of a road section at a first time step and a second set of detection points representative of the lane at a second time step; and a processor configured to:

determine a set of predicted points for the second time step from the first set of detection points;

obtain a set of fused points from the second set of detection points and the set of predicted points; and navigate the vehicle using the set of fused points;

wherein a detection point in the first set of detection points has a covariance matrix associated with the vehicle, further comprising determining a predicted point in the set of predicted points by updating the covariance matrix using a time interval between the first time step to the second time step.

* * * * *